US009311430B2

(12) United States Patent
Watanabe et al.

(10) Patent No.: US 9,311,430 B2
(45) Date of Patent: Apr. 12, 2016

(54) LOG-LINEAR DIALOG MANAGER THAT DETERMINES EXPECTED REWARDS AND USES HIDDEN STATES AND ACTIONS

(71) Applicant: Mitsubishi Electric Research Laboratories, Inc., Cambridge, MA (US)

(72) Inventors: Shinji Watanabe, Arlington, MA (US); Hao Tang, Chicago, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 305 days.

(21) Appl. No.: 14/106,968

(22) Filed: Dec. 16, 2013

(65) Prior Publication Data

US 2015/0169553 A1 Jun. 18, 2015

(51) Int. Cl.
| | |
|---|---|
| *G06F 15/18* | (2006.01) |
| *G06F 17/30* | (2006.01) |
| *G06F 17/27* | (2006.01) |
| *G10L 15/22* | (2006.01) |
| *G10L 15/18* | (2013.01) |

(52) U.S. Cl.
CPC ........ *G06F 17/30976* (2013.01); *G06F 17/279* (2013.01); *G06F 17/2785* (2013.01); *G10L 15/22* (2013.01); *G10L 15/1822* (2013.01)

(58) Field of Classification Search
CPC ....... G06N 99/005; G06Q 10/04; G10L 13/00
USPC .................................................... 706/12, 45
See application file for complete search history.

(56) References Cited

U.S. PATENT DOCUMENTS

| | | | |
|---|---|---|---|
| 8,433,578 B2 | 4/2013 | Williams et al. | |
| 2011/0010164 A1 | 1/2011 | Williams et al. | |
| 2011/0137654 A1 | 6/2011 | Williams et al. | |
| 2012/0022952 A1* | 1/2012 | Cetin | G06Q 10/04 705/14.73 |
| 2012/0053945 A1 | 3/2012 | Gupta et al. | |
| 2013/0159826 A1* | 6/2013 | Mason | G06F 17/30873 715/205 |
| 2015/0025931 A1* | 1/2015 | Li | G06Q 10/0633 705/7.27 |

OTHER PUBLICATIONS

Young et al. "Using POMDPS for Dialog Management," Spoken Language Technology Workshop, 2006. IEEE, Dec. 10, 2006. pp. 8-13.
Yoshino et al. "Statistical Dialogur Management using Intention Dependency Graph." International Joint Conference on Natural Language Processing. Oct. 1, 2013. internet. https://www.merl.co/publications/docs/TR2013-096.pdf. retrieved Feb. 16, 2015.
Williams et al. "Partially Observable Markov Decision Proceses for Spoken Dialog Systems." Computer Speech and Language, Elsevier, London, GB. vol. 21, No, 2, Nov. 12, 2006.

\* cited by examiner

*Primary Examiner* — David Vincent
(74) *Attorney, Agent, or Firm* — Gene Vinokur; Dirk Brinkman

(57) ABSTRACT

A dialog manager receives previous user actions and previous observations and current observations. Previous and current user states, previous user actions, current user actions, future system actions, and future observations are hypothesized. The user states, the user actions, and the user observations are hidden. A feature vector is extracted based on the user states, the system actions, the user actions, and the observations. An expected reward of each current action is based on a log-linear model using the feature vectors. Then, the current action that has an optimal expected reward is outputted.

13 Claims, 5 Drawing Sheets

LOG-LINEAR DIALOG MANAGER THAT DETERMINES EXPECTED REWARDS AND USES HIDDEN STATES AND ACTIONS

FIELD OF THE INVENTION

This invention relates generally to text and speech processing, and more particular to dialog mangers.

BACKGROUND OF THE INVENTION

A dialog manager is a system that accomplishes certain tasks using a dialog, either spoken or text. The dialog alternates between user and system turns. The dialog can include sequences of user actions and system actions. The user actions are hidden from the system. The system determines the user actions from observations. The user has a changing state that is also hidden from the system. The system uses planning to determine a next system action given previous system actions and observations based on user speech or texts. The planning is described below.

The dialog manager can be rule based, or use a statistical framework, e.g., a Partially Observable Markov Decision Process (POMDP). In a POMDP dialog system, the dialog is represented by a set of random variables. At each turn, the dialog including an observed variable representing what the user said, a hidden state variable representing the progress of the dialog so far, and a selected system action. The POMDP model defines two probabilistic dependencies: the conditional probability of the current state given the previous state and system action; and the conditional probability of the observation given the current state and previous system action.

A reward function specifies, for each turn, a fitness criterion as a function of the state and selected action for that turn. Given the reward function, it is possible to determine a policy that provides the optimal system action given what is known about the state distribution at the current time. This policy can then be used to generate system actions in the course of a dialog. Selecting system actions in order to maximize the reward is called planning.

To have a working system, the model parameters that define probabilities in the POMDP need to be estimated. This estimation is called learning. The parameters are typically estimated using a maximum likelihood (ML) criterion, rather than using the reward function. For example, a maximum likelihood dynamic Bayesian network (DBN) can be used. A major problem with those approaches is that planning and learning are optimized separately and independently using different criteria. In addition, planning and learning are notoriously difficult optimization problems because inference becomes intractable in variable spaces large enough to handle real problems.

SUMMARY OF THE INVENTION

The embodiments of the invention provide text and spoken dialog systems based on a statistical dialog framework. In contrast with a generative model used in conventional approaches, the invention uses a discriminative model to represent the relationship between system actions, observations, and other information based on a log-linear model framework. Then, the dialog manager outputs an appropriate system action given a sequences of previous observations and system actions by directly optimizing an expected reward using a belief propagation (BP) procedure.

Because the invention uses a log-linear model, various features obtained during dialogs can be incorporated in the model. The parameters in the log-linear model can be statistically trained by using dialog data based on the belief propagation procedure to improve performance using refined system actions.

The embodiments provide a coherent system that has the advantage of a consistent optimization criterion, and at the same time is more efficient to optimize. The dialog system is modeled using a log-linear probability distribution. Thus, the invention provides a log-linear dialog manager.

Log-linear distributions have been, used to model sequences since the introduction of conditional random fields (CRF). Although log-linear models in general cannot represent all distribution families, their flexible use of feature functions enables the models to express a wide family of probabilistic models. Because the model is a Markov chain, efficient procedures can be exploited, for optimization. In particular, the embodiments optimize a sum of rewards along the time axis.

To represent the space of possible states, user actions, and system actions, context-five grammar (CFG) are used each of which is based on a graph of semantic representations related to the domain of the dialog system.

Instead of being simple multinomials, the random variables take values in the space of parse trees generated by the CFGs. This provides a rich structure that enables the extraction of a wide range of features. Because of the flexible use of features inherent in log-linear models, the features can be designed to make the dialog system behave exactly like a conventional rule-based dialog system as a special case. This is done by implementing the rules of the dialog system as indicator-function features, and initializing the parameters, such that the log-linear probability distributions correspond to these rules.

BRIEF DESCRIPTION THE FIGURES

DETAILED DESCRIPTION OF THE PREFERRED EMBODIMENTS

Planning

Figure 1:
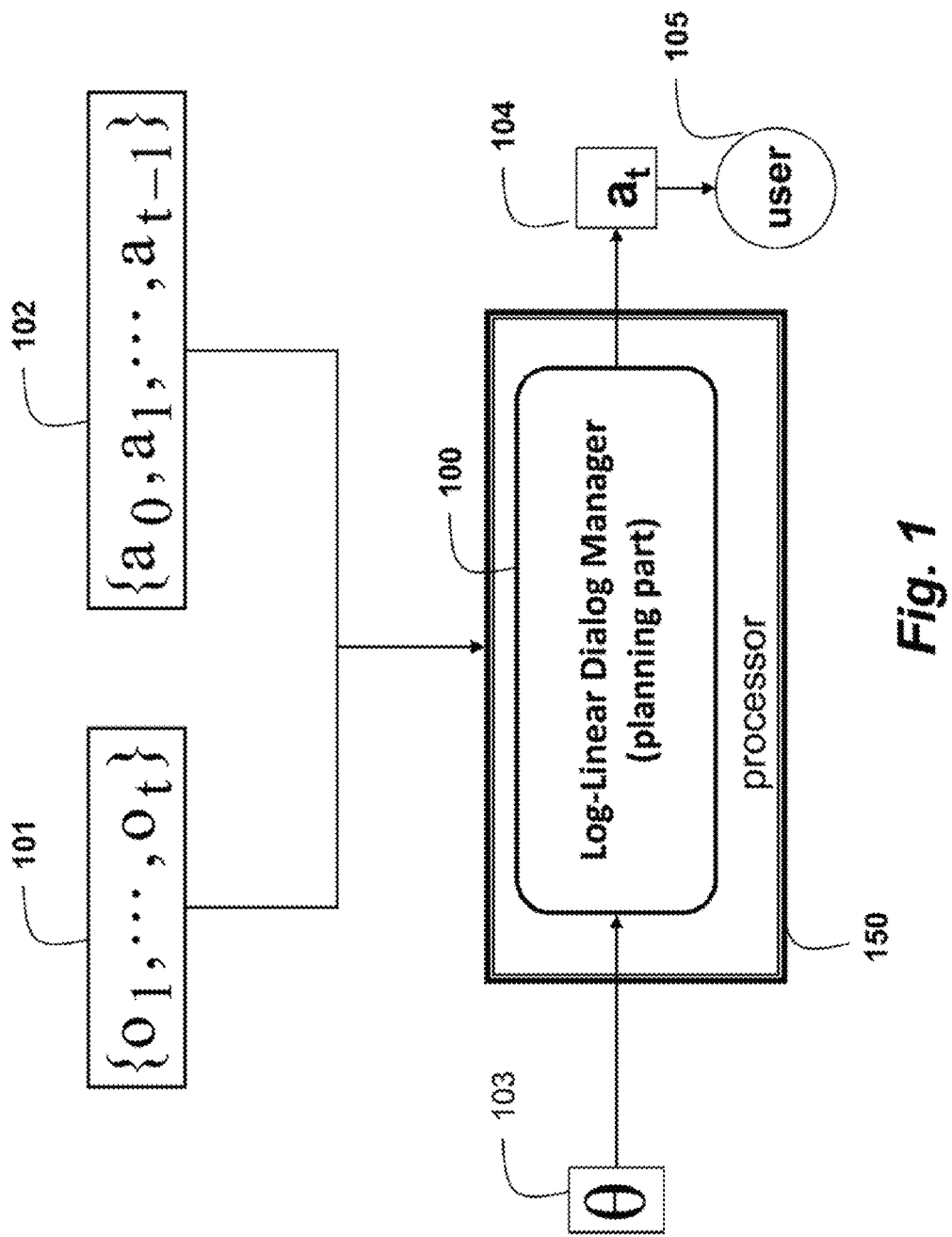
FIG. 1 is a flow diagram of a planning part of a dialog manager according to embodiments of the invention.
Figure 2:
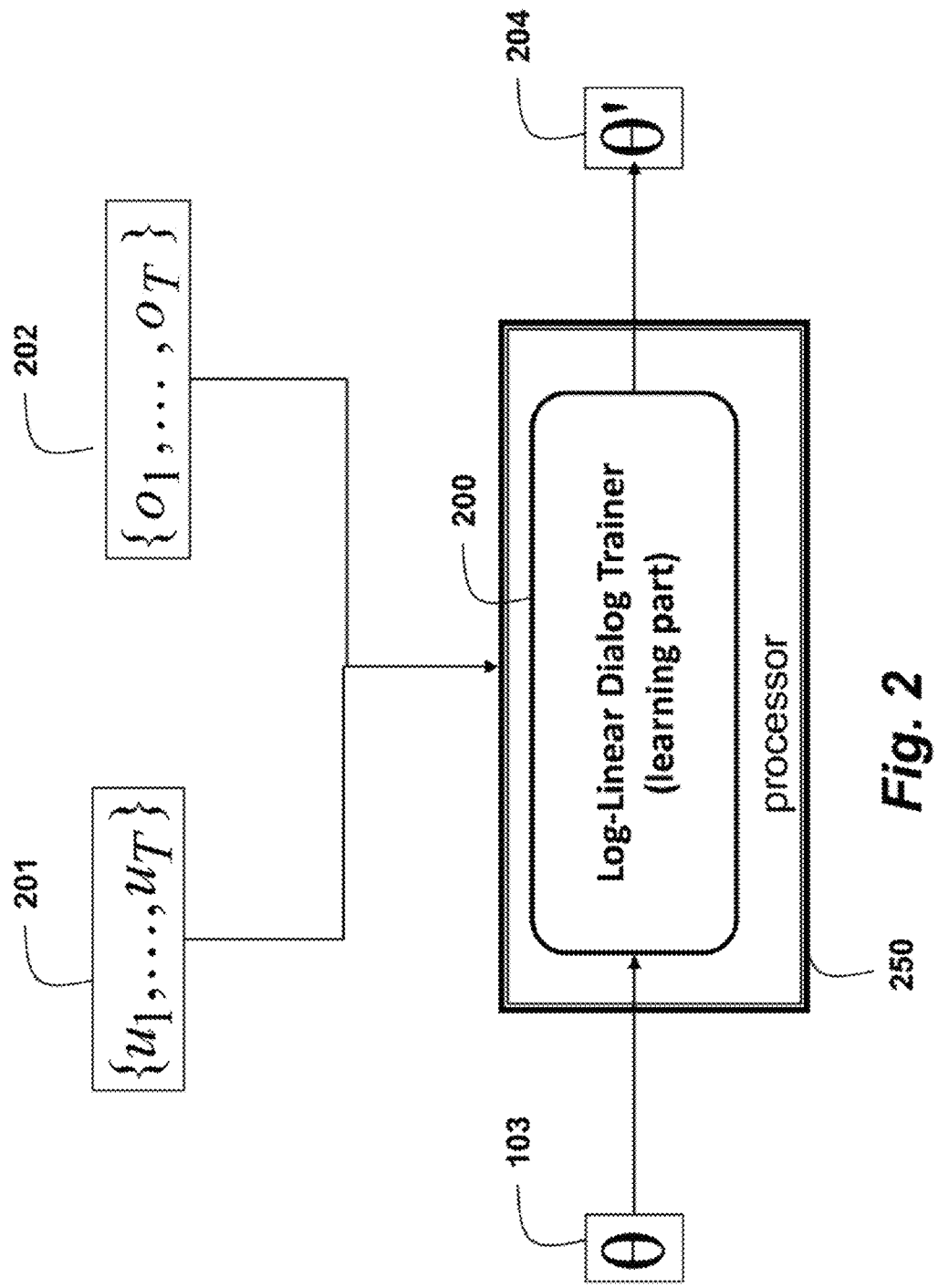
FIG. 2 is a flow diagram of a learning part of a dialog manager according to embodiments of the invention.

As shown in FIGS. 1 and 2, the embodiments of our invention provide a log-linear dialog manager. The system includes a planning part 100 and a learning part 200. The methods for the two parts can be performed in processors 150 and 250 connected to memory and input/output interfaces by busses as known in the art. Processors 150 and 250 can be combined.

System Model

Our probabilistic model has four variables at each time step t. Two are observable variables: a system action $a_t$ 102 and an observation $o_t$ 101. The other two are latent variables are inferred: a user action $u_t$ 201 and the state $s_t$.

Each step of the dialog proceeds as follows. Based on all of the previous system actions and previous observations up to time t−1, the system prompts the user with a query $a_{t-1}$. The response by the user is represented by $o_t$. In one embodiment, $o_t$ is a sequence of words spoken by the user. However, it is understood that response can be typed text, or the response can be entered into the system by other means.

The meaning of the response is represented by the user action $u_t$, which can be inferred from the observation. The new state $s_t$, can be inferred, based on the system action $a_{t-1}$ and user action $u_t$, and the previous state $s_{t-1}$. In our system, the state $s_t$ represents the user's intention, although in general it could also include additional contextual in formation.

Using subscripted colons to denote sequences, e.g., $s_{0:T} \equiv \{s_0, s_1, \ldots, s_T\}$, a dialog session of duration T is represented by four variable sequences: $s_{0:T}, a_{0:T}, o_{1:T}, u_{1:T}$.

Figure 3:
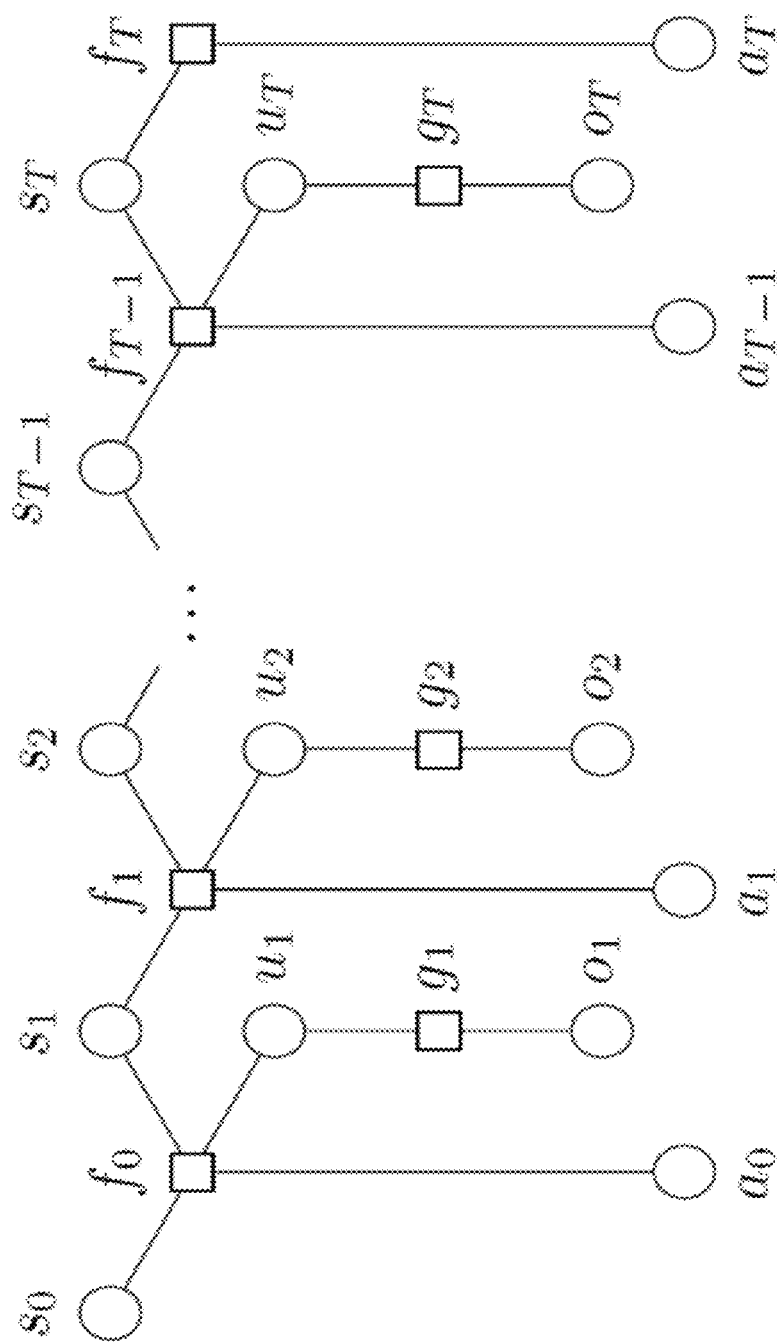
FIG. 3 is an example parse tree according to embodiments of the invention.

FIG. 3 shows the model for a dialog session as represented by a factor graph, which for our log-linear model corresponds to the following joint probability distribution over the variables:

$$p(s_{0:T}, a_{0:T}, u_{1:T}, o_{1:T}) = \qquad (1)$$

$$\frac{1}{Z_\theta} \exp\left[\sum_{t=0}^{T} \theta_f^T \varphi_f(s_t, a_t, s_{t+1}, u_{t+1}) + \sum_{t=1}^{T} \theta_g^T \varphi_g(u_t, o_t)\right],$$

where $Z_\theta$ is a normalizing constant, $\phi_f$ and $\phi_g$ are vectors of feature functions, and $\theta_f$ and $\theta_g$ are vectors of the corresponding model parameters, respectively.

At time t=T, $s_{t+1}$ and $u_{t+1}$ are undefined, so as shown in factor $f_T$ of the factor graph. At time t=T we define $\phi_f$ as a function of only its first two inputs. To simplify notation, we also define the following vectors:

$$\theta \equiv \begin{bmatrix} \theta_f \\ \theta_g \end{bmatrix}, \varphi(t) \equiv \begin{bmatrix} \varphi_f(s_t, a_t, s_{t+1}, u_{t+1}) \\ \varphi_g(u_t, o_t) \end{bmatrix}, \qquad (2)$$

which enable us to rewrite equation (1) more succinctly as $$p(s_{0:T}, a_{0:T}, u_{1:T}, o_{1:T}) = \frac{1}{Z_\theta} \exp\left[\sum_{t=0}^{T} \theta^T \varphi(t)\right], \qquad (3)$$

$$\text{where } Z_\theta = \sum_{\substack{s_{0:T}, a_{0:T}, \\ u_{1:T}, o_{1:T}}} \exp\left[\sum_{t=0}^{T} \theta^T \varphi(t)\right]. \qquad (4)$$

is the partition function of $p(s_{0:T}, a_{0:T}, u_{1:T}, o_{1:T})$.

Variable Spaces

We let S, U, A, and O represent the variable spaces, i.e., the set of all possible values for the variables $s_t$, $u_t$, $a_t$, and $o_t$, respectively. Each observation $o \in O$ can be waveforms, acoustic features, recognized texts, and/or linguistic features. We use $o \in O$ to represent the input sequence, and we define the variable space O as the set of all sequences of words in a vocabulary set V.

We define each of the variable spaces S, U, and A using a context-free grammar (CFG) including a set of production rules. Each variable space is defined as the set of all possible parse trees that can be generated by its CFG.

Figure 4:
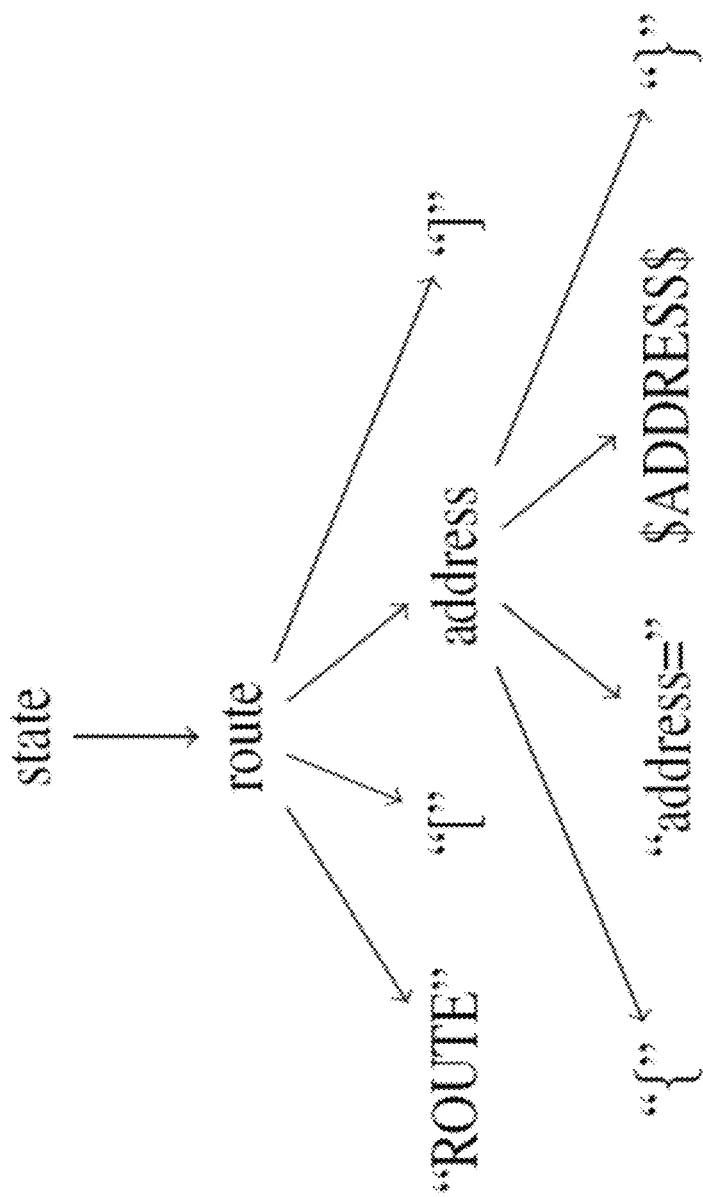
FIG. 4 is a parse tree of an example state according to embodiments of the invention.
Figure 5:
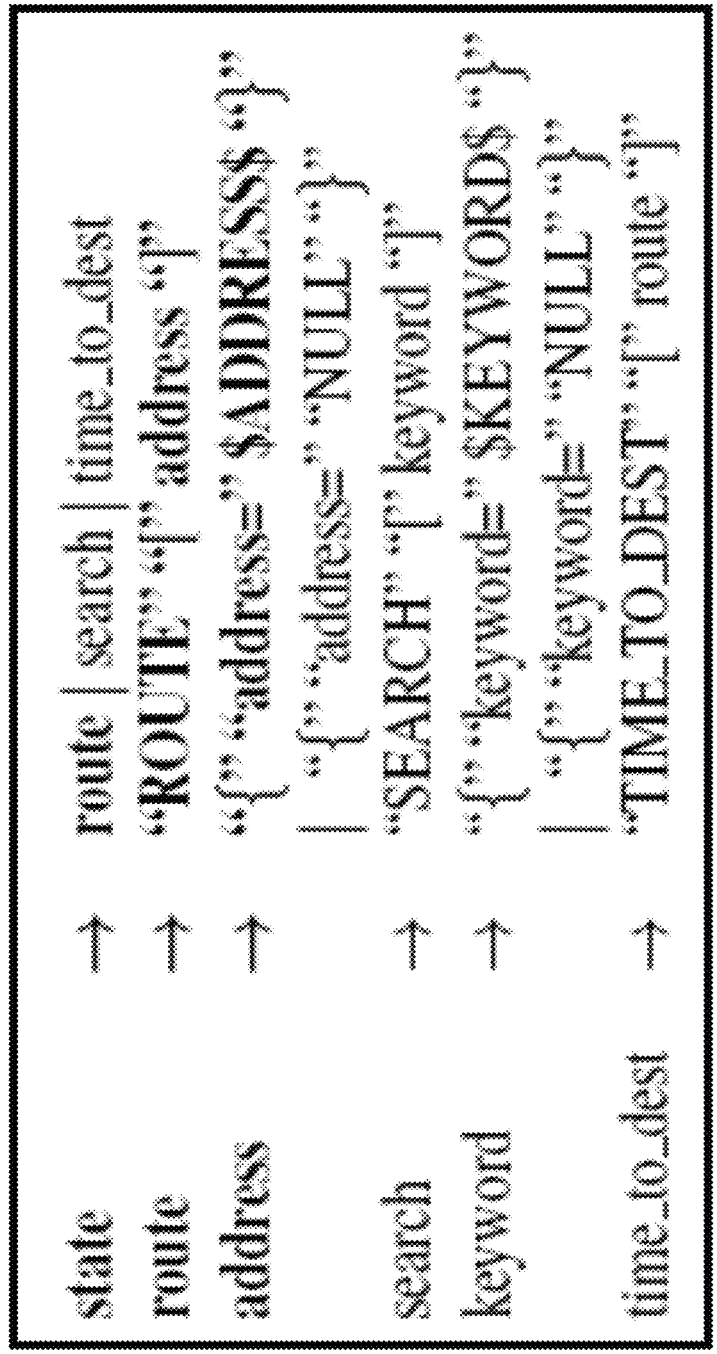
FIG. 5 is a block diagram of example production rules for the parse tree of FIG. 4.

FIG. 5 shows some of the production rules in the CFG that defines the variable space S. Each parse tree in S is a possible value of the state $s_t$. FIG. 5 shows one possible value for state $s_t$, which one parse tree in S that was generated using the production rules shown in boldface in FIG. 4. In FIG. 4, terminals are enclosed in quotation marks, while nonterminals are not. The variable $ADDRESS$ can either be further extended with other production rules or remain as a free variable.

Features

As can be seen in the factor graph in FIG. 3 and in equation (1), there are two types of factors in our model. The first, denoted f, models statistical dependencies between the previous and current state, the system action, and the user action. The second, denoted g, models dependencies between observed word sequences and their semantic interpretations. For the variables whose spaces are defined using CFGs, we treat each variable value (each parse tree) as a set of active production rules. For example, the production rules that are active in the parse tree of FIG. 5 are shown in boldface in the production rules of FIG. 4.

Suppose $G_S$, $G_U$, and $G_A$ are the set of production rules in the CFGs that define the variable spaces for S (states), U (user actions), and A (system actions), respectively. For factor g, we associate each production rule in a user action with a language model for the associated word sequences. Specifically, given a user action $u_t$ and observation $o_t$, we have features of the form $1_{k \in u_t, w_{i-1} w_i \in o_t}$, which denotes an indicator function that equals 1 if and only if a particular production rule $k \in G_U$ is active in the parse tree of user action $u_t$ and a particular bigram $w_{i-1} w_i$ is present in the word sequence of observation $o_t$.

The language model for a production rule that appears close to the root of the tree models a general class of utterance, whereas production rules that appear close to the leaves of the tree are more specialized. For factor f, we can consider production rules that co-occur. For example, the feature $1_{k \in s_{t-1}, k' \in s_t}$, which concerns two particular production rules k,k'∈$G_S$, equals 1 if and only if k is active in state $s_{t-1}$, and k' is active in state $s_t$. Another type of feature type typically seen in dialog systems is $1_{k \in s_{t-1}, k' \in s_t, j \in a_{t-1}}$, which also requires that production rule j∈$G_A$ is active in system action $a_{t-1}$. This feature indicates that a particular system action tends to induce a particular state transition.

Planning and Learning

The two basic problems a dialog manager needs to solve are planning 100 and learning 200. We assume there is a reward function r:S×A→$R^+$ that assesses our model. We now describe the planning and learning in terms of the reward function.

Planning

Planning at time τ is the problem of determining the optimal system action $a_\tau$, given all previous system actions $a_{0:\tau-1}$ and observations $o_{1:\tau}$. Suppose the dialog has a duration T. We define the planning; problem as determining $a_\tau$ to maximize the expected reward E as an objective function $$E_{\substack{s_{0:T}, a_{\tau+1:T}, \\ u_{1:T}, o_{\tau+1:T}}} \left[\frac{1}{T+1} \sum_{t=0}^{T} r(s_t, a_t) \mid a_{0:\tau-1}, o_{1:\tau}\right]. \qquad (5)$$

The expectation is taken over all variables not given, i.e., all states, all user actions, and all future system actions and observations.

The objective function could be optimized exactly by hypothesizing each action $a_\tau$, determining the expected reward given that action using the sum-product procedure, and selecting the action that maximized expected reward.

However, for ease of implementation and speed, we instead optimize the objectives variational lower bound, $$E_{\substack{s_{0:T}, a_{\tau+1:T}, \\ u_{1:T}, o_{\tau+1:T}}} \left[ \prod_{t=0}^{T} \left( \frac{r(s_t, a_t)}{\gamma_t(T+1)} \right)^{\gamma_t} \Big| a_{0:\tau-1}, o_{1:\tau} \right], \quad (6)$$

obtained from Jensen's inequality, where the $\gamma_t$ are variational parameters such that $\Sigma_t \gamma_t = 1$. Although the $\gamma_t$ can be optimized using an expectation-maximization (EM) procedure, take $\gamma_t = 1/(T+1)$ to further simplify the computation.

This product form has the nice property that the reward factorizes with time. In other words, equation (6) can be expanded to $$\frac{1}{Z'} \exp\left[ \sum_{t=0}^{T} \left[ \theta^T \varphi(t) + \gamma_t \log\left( \frac{r(s_t, a_t)}{\gamma_t(T+1)} \right) \right] \right], \quad (7)$$

where Z' is the partition function of p with $a_{0:\tau-1}$, $o_{1:\tau}$ given. Now, the optimal $a_\tau$ can be determined by a conventional sum-product procedure on the graphical model with an additional term for the reward.

First, we collect beliefs from both ends of the graphical model to time $\tau$, and determining the $a_\tau$ there that maximizes equation (6). If we write out the belief propagation explicitly, then it becomes a forward-backward procedure. For example, the forward message $$m_{f_t \to s_{t+1}}(s_{t+1})$$

from factor node $f_t$ to variable node $s_{t+1}$ is determined by the following summations over of the messages $$m_{a_t \to f_t}(a_t), \; m_{s_t \to f_t}(s_t), \text{ and } m_{u_{t+1} \to f_t}(u_{t+1})$$

with the (un-normalized) probability distribution of time $t$ to $t+1$ $\exp\left( \theta_f^T \varphi_f(s_t, s_{t+1}, a_t, u_{t+1}) + \gamma_{t'} \log \frac{r(s_{t'}, a_{t'})}{\gamma_{t'}(T+1)} \right),$ $$m_{f_t \to s_{t+1}}(s_{t+1}) = \sum_{\substack{s_{0:t}, u_{1:t+1}, \\ u_{0:t}, o_{1:t+1}}} \exp\left( \sum_{t'=0}^{t} \theta^T \varphi(t') + \gamma_{t'} \log \frac{r(s_{t'}, a_{t'})}{\gamma_{t'}(T+1)} \right),$$

$$= \sum_{s_t, a_t, u_{t+1}} \left[ m_{a_t \to f_t}(a_t) \, m_{s_t \to f_t}(s_t) \, m_{u_{t+1} \to f_t}(u_{t+1}) \times \right.$$
$$\left. \exp\left( \theta_f^T \varphi_f(s_t, s_{t+1}, a_t, u_{t+1}) + \gamma_{t'} \log \frac{r(s_{t'}, a_{t'})}{\gamma_{t'}(T+1)} \right) \right].$$

Here, $$m_{a_t \to f_t}(a_t)$$

is the message from variable node $a_t$ to factor node $f_t$. We can use any distribution, including a uniform distribution where we don not assume any prior distributions for $$a_t. \; m_{s_t \to f_t}(s_t)$$

is the message from variable node $s_t$ to factor node $$f_t. \; m_{s_t \to f_t}(s_t)$$

is recursively determined from the previous step.

The message from variable node $u_{t+1}$ to factor node $f_t$ is $$m_{u_{t+1} \to f_t}(u_{t+1}).$$

message is determined from the distribution as $$m_{u_{t+1} \to f_t}(u_{t+1}) = \sum_{o_{t+1}} \exp\left( \sum_{t'=0}^{t} \theta^T \varphi_g(o_{t+1}, u_{t+1}) \right).$$

Thus, we avoid the summation over sequences $$\left( \sum_{\substack{s_{0:t}, u_{1:t+1}, \\ a_{0:t}, o_{1:t+1}}} \right)$$

to determine the message $$m_{f_t \to s_{t+1}}(s_{t+1}).$$

The other messages can also be determined efficiently without computing the summation over the sequences based on the belief propagation methods.

Note that averaging over future actions using the sum-product procedure is different from conventional POMDP optimization, which seeks to maximize the reward over future system actions. It is also possible to use a max-product procedure on $a_t$ while using sum-product on the other variables to achieve maximization over future system actions. However, the model itself contains a stochastic policy that provides a predictive distribution over future actions.

Learning

The learning part 200 is similar to planning, except that instead of determining the optimal action we are interested in determining the optimal model parameters. In other words, we want to find $\theta$ 103 such that the expected reward $$R(\theta) = E_{\substack{s_{0:T}, \\ u_{1:T}}} \left[ \frac{1}{T+1} \sum_{t=0}^{T} r(s_t, a_t) | a_{0:T}, o_{1:T} \right] \quad (8)$$

is maximized given all system actions $a_{0:T}$ and all observations $o_{1:T}$. Again the expectation is taken over all variables not given, namely all states and all user actions. Similar to the planning part, we could also use the variational lower bound of equation (8) here.

We use gradient descent to optimize the learning objective. In general, for any utility function v(x) and probability distribution of the form based on the log-linear model $$p(x) = \frac{1}{Z_\theta} \exp(\theta^T \varphi(x)), \text{ where } Z_\theta = \sum_x (\theta^T \varphi(x)), \quad (9)$$

the derivative of the expected utility is:

$$\frac{\partial}{\partial \theta} E_x[v(x)] = E_x[\varphi(x)v(x)] - E_x[\varphi(x)]E[v(x)]. \quad (10)$$

Note that for each parameter $\theta_i$ in $\theta$, the derivative is the covariance between the corresponding feature $\phi_i$ and the utility. Thus, the parameters corresponding to features that are positively correlated with utility are increased, while those whose corresponding features are negatively correlated with utility are decreased.

Applying this to our model gives:

$$\frac{\partial R(\theta)}{\partial \theta} = \underset{\substack{s_{0:T},\\u_{1:T}}}{E}\left[\left(\sum_{t=0}^{T} \varphi(t)\right)\left(\sum_{t=0}^{T} \frac{r(s_t, a_t)}{T+1}\right)\right] - \underset{\substack{s_{0:T},\\u_{1:T}}}{E}\left[\sum_{t=0}^{T} \varphi(t)\right] \underset{\substack{s_{0:T},\\u_{1:T}}}{E}\left[\sum_{t=0}^{T} \frac{r(s_t, a_t)}{T+1}\right], \quad (11)$$

where expectations are determined using $p(s_{0:T}, u_{1:T} | a_{0:T}, o_{1:T})$. In the general case, it may be hard to determine these quantities. We use particle belief propagation.

Particle Belief Propagation

Because the variable spaces are too large to marginalize over, we solve the problem using particle belief propagation.

Consider a message $m_{f_t \to s_{t+1}}(s_{t+1})$ passing from factor node $f_t$ to variable node $s_{t+1}$ by marginalizing over $s_t$, $a_t$, and $u_{t+1}$:

$$m_{f_t \to s_{t+1}}(s_{t+1}) = \sum_{s_t, a_t, u_{t+1}} \left[ m_{a_t \to f_t}(a_t) \, m_{s_t \to f_t}(s_t) \, m_{u_{t+1} \to f_t}(u_{t+1}) \times \exp(\theta_f^T \varphi_f(s_t, s_{t+1}, a_t, u_{t+1})) \right].$$

If we rewrite the sum with importance sampling, then we obtain $$m_{f_t \to s_{t+1}}(s_{t+1}) = E_{\pi_t}\left[ m_{a_t \to f_t}(a_t) \, m_{s_t \to f_t}(s_t) \, m_{u_{t+1} \to f_t}(u_{t+1}) \times \frac{\exp(\theta_f^T \varphi_f(s_t, s_{t+1}, a_t, u_{t+1}))}{\pi_t(a_t)\pi_t(u_t)\pi_f(s_t)} \right],$$

for some sampling distribution $\pi_t(a)$, $\pi_t(u)$, $\pi_t(s)$ over which the expectation is determined.

We can then approximate the expectation with a sum $$m_{f_t \to s_{t+1}}(s_{t+1}) = \frac{1}{N} \sum_{i=1}^{N} \left[ m_{a_t \to f_t}(a_t^{(i)}) \, m_{s_t \to f_t}(s_t^{(i)}) \, m_{u_{t+1} \to f_t}(u_{t+1}^{(i)}) \times \frac{\exp(\theta_f^T \varphi_f(s_t^{(i)}, s_{t+1}, a_t^{(i)}, u_{t+1}^{(i)}))}{\pi_t(a_t^{(i)})\pi_t(u_t^{(i)})\pi_t(s_t^{(i)})} \right],$$

over samples $\{(s_t^{(1)}, a_t^{(1)}, u_{t+1}^{(1)}), \ldots, (s_t^{(N)}, a_t^{(N)}, u_{t+1}^{(N)})\}$.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A dialog manager comprising the steps of:
    receiving previous user actions and previous observations and current observations;
    hypothesizing previous and current user states, previous user actions, current user actions, future system actions, and future observations, wherein the user states, the user actions, and the user observations are hidden;
    extracting a feature vector based on the user states, the system actions, the user actions, and the observations;
    determining an expected reward of each current action based on a log-linear model using the feature vectors; and
    outputting the current action that has an optimal expected reward, wherein the steps are performed in a processor.

2. The dialog manager of claim 1, wherein a probabilistic model has four variables at each time step t, including two observable variables: the system action $a_t$, the observation $o_t$, and two latent variables: the user action $u_t$ and the user state $s_t$.

3. The method of claim 2, wherein a dialog session of duration T is represented by four variable sequences $s_{0:T}, a_{0:T}, o_{1:T}, u_{1:T}$.

4. The method of claim 3, wherein the dialog session is represented by a factor graph, which corresponds to a joint probability distribution $$p(s_{0:T}, a_{0:T}, u_{1:T}, o_{1:T}) = \frac{1}{Z_\theta} \exp\left[ \sum_{t=0}^{T} \theta_f^T \varphi_f(s_t, a_t, s_{t+1}, u_{t+1}) + \sum_{t=1}^{T} \theta_g^T \varphi_g(u_t, o_t) \right],$$

where $Z_\theta$ is a normalizing constant, $\phi_f$ and $\phi_g$ are the feature vectors, and $\theta_f$ and $\theta_g$ vectors of corresponding model parameters, respectively.

5. The method of claim 1, wherein the observations are spoken words or text.

6. The method of claim 3, wherein S, U, A, and O represent the variable spaces that is a set of all possible values for the variables $s_t$, $u_t$, $a_t$, and $o_t$, respectively.

7. The method of claim 6, further comprising:
    defining the variable spaces S, U, and A using a context-free grammar (CFG) including a set of production rules.

8. The method of claim 7, wherein each variable space is defined as a set of all possible parse trees that can be generated by the CFG.

9. The method of claim 3, wherein a planning part of the dialog manger determines an optimal system action $a_\tau$, given all previous system actions $a_{0:\tau-1}$ and previous observations $o_{1:\tau}$.

10. The method of claim 3, further comprising:
maximizing an objective function $$E_{\substack{s_{0:T}, a_{\tau+1:T}, \\ u_{1:T}, o_{\tau+1:T}}} \left[ \frac{1}{T+1} \sum_{t=0}^{T} r(s_t, a_t) \mid a_{0:\tau-1}, o_{1:\tau} \right]$$

to determine the expected reward.

11. The method of claim 10, further comprising:
optimizing a variational lower bound on the objective function.

12. The method of claim 10, wherein the objective, function optimized using a gradient descent.

13. The method of claim 10, wherein the objective function is optimized using particle belief belief propagation.

* * * * *